US009229940B2

(12) United States Patent
Kodama

(10) Patent No.: US 9,229,940 B2
(45) Date of Patent: Jan. 5, 2016

(54) METHOD AND APPARATUS FOR IMPROVING THE INTEGRATION BETWEEN A SEARCH ENGINE AND ONE OR MORE FILE SERVERS

(75) Inventor: Shojii Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 567 days.

(21) Appl. No.: 12/554,290

(22) Filed: Sep. 4, 2009

(65) Prior Publication Data
US 2009/0327248 A1    Dec. 31, 2009

Related U.S. Application Data

(62) Division of application No. 10/688,287, filed on Oct. 16, 2003, now abandoned.

(51) Int. Cl.
*G06F 17/30* (2006.01)

(52) U.S. Cl.
CPC .................................. *G06F 17/30067* (2013.01)

(58) Field of Classification Search
CPC ................................................... G06F 17/30067
USPC ................................................... 707/600, 828
See application file for complete search history.

(56) References Cited

U.S. PATENT DOCUMENTS

| | | | |
|---|---|---|---|
| 4,747,043 A * | 5/1988 | Rodman | 711/124 |
| 5,845,273 A | 12/1998 | Jindal | |
| 6,067,541 A * | 5/2000 | Raju et al. | 707/3 |
| 6,269,362 B1 | 7/2001 | Broder et al. | |
| 6,356,863 B1 | 3/2002 | Sayle | |
| 6,418,453 B1 | 7/2002 | Kraft et al. | |
| 6,636,854 B2 * | 10/2003 | Dutta et al. | 707/1 |
| 6,714,953 B2 * | 3/2004 | Grubbs et al. | 707/205 |
| 7,020,658 B1 | 3/2006 | Hill | |
| 7,231,382 B2 | 6/2007 | Schmitz et al. | |
| 2004/0215601 A1 | 10/2004 | Liu et al. | |

FOREIGN PATENT DOCUMENTS

| | | | |
|---|---|---|---|
| JP | 2001-516928 A | 10/2001 | |
| JP | 2001-318942 A | 11/2001 | |

OTHER PUBLICATIONS

Google Search Appliance, http://www.google.com; Google, Inc., located at 2400 Bayshore Parkway, Mountain View, California 94043.
EMC Celerra File Server, E Testing Labs, Jul. 2001, pp. 1-4; E Testing Labs located at 1001 Aviation Parkway, Suite 400, Morrisville, NC 27560.
Network Appliance—Antivirus Scanning Best Practices Guide, http://www.netapp.com, May 28, 2002, pp. 1-9; . Network Appliance located at 495 East Java Drive, Sunnyvale, California 94089.
How Information Gets Delivered, AUSPEX 'CogniStor' Technology Opens New Doors in Enterprise Data Automation, Nov. 19, 2002; AUSPEX located at 2800 Scott Blvd., Santa Clara, California 95050.

* cited by examiner

*Primary Examiner* — Apu Mofiz
*Assistant Examiner* — Chelcie Daye
(74) *Attorney, Agent, or Firm* — Mattingly & Malur, PC

(57) ABSTRACT

In one aspect of the invention, a search engine parses files stored among one or more file servers in order to create and maintain index information used by the search engine to perform searches. For a given file server, the population of files presented to the search engine is reduced in size to facilitate the process of updating the index. In another aspect of the invention, the file server limits the files presented in a directory list request made by a search engine. This reduces the number of file s that need to be considered when performing an index update.

20 Claims, 9 Drawing Sheets

| # | File Server Name | Export Name | Last Indexed Time |
|---|---|---|---|
| 1 | file - serverA | exportA | 8/1/2003 1:00 pm |
| 2 | file - serverA | exportB | Not yet |
| 3 | file - serverB | exportC | 7/20/2003 2:00 am |

| File Types | doc, ppt, xls |
| --- | --- |
| Owners | user1, user2, user3 |
| Created Time | From 2003/1/1<br>To 2003/3/31 |
| File Size | Under 5MB |

METHOD AND APPARATUS FOR IMPROVING THE INTEGRATION BETWEEN A SEARCH ENGINE AND ONE OR MORE FILE SERVERS

CROSS-REFERENCE

This is a divisional application of U.S. Ser. No. 10/688,287, filed Oct. 16, 2003(abandoned), the contents of which are hereby incorporated by reference.

BACKGROUND OF THE INVENTION

The present invention is related to computer file access and in particular to improving the performance of index maintenance in search engines.

The Internet is commonly associated with the world wide web (the "web"). The web has facilitated an explosive proliferation of information to the millions of users who access the web. This information is accessed in the form of files by web servers. However, the Internet has also provided access to files provided by file servers which pre-date the web, such as bulletin boards, tip sites, and so on.

An intranet that is a private network of a company or any other organization is also used for sharing files. In this case, a file server or a NAS (Network Attached Storage) is common to store and get files. NFS and CIFS protocols are used for accessing files.

Search engines have become a valuable tool in navigating the Internet and/or file servers. Search engines are a commonly used tool to access the many millions of files on the Internet and/or file servers. Typically, the search engine accepts search requests from a user and sends a obtains a list of file names that match the search conditions.

An integral component of a search engine is its "index." The index is a collection of information that is parsed or otherwise generated from an analysis of a file, and comprises keywords and related information used by the search engine to facilitate a file search. The specific information content and data structures of the index vary from one search engine to another, and is beyond the scope of the present invention.

However, common operations that are performed by typical search engines include the creation of the index and the subsequent maintenance or update of the index. The creation of the index typically involves the search engine checking updated dates of every files, reading every updated file on the Internet and/or file servers and parsing its contents to build up the index.

Invariably, file contents change over time. The search engine must therefore perform updates to the index in order that the index be current. This task typically involves once again crawling the web and/or file servers to access attributes of each file, and then determine whether the file has been updated since the last time the index was updated; or when the index was created, in the case of the very first index update. This determination can be made, for example, by accessing the modification date of the file and comparing it against the index. Making this check reduces the update effort and thus improves the update time; not every file will be re-indexed, only those that have changed relative to the time of the index.

Nevertheless, this update process remains a tedious task because modification date of every files need to be checked. This creates a large volume of traffic, just for the purpose of checking attributes of files. It is therefore very desirable to reduce Internet traffic and/or intranet traffic attributed to the indexing function. It is also desirable to further reduce the indexing effort to further increase the update time of an index.

SUMMARY OF THE INVENTION

In accordance with one aspect of the invention, an update list is maintained in a file server. Update information based on the update list is communicated to a search engine. The update information comprises only those files that have been modified during an previous update operation on an index in the search engine.

In accordance with another aspect of the invention, the file server presents a restricted directory listing to a search engine, as compared to a directory listing of the same directory to a client other than a search engine. A set of one or more filtering criteria can be used to limit the number of files presented to the search engine. This reduces the number of files the search engine must examine when performing an update of its search index.

In accordance with still another aspect of the invention, an update list is maintained in the file server. Files referenced in the update list are limited depending on one or more filtering criteria.

BRIEF DESCRIPTION OF THE DRAWINGS

Aspects, advantages and novel features of the present invention will become apparent from the following description of the invention presented in conjunction with the accompanying drawings.

DESCRIPTION OF THE SPECIFIC EMBODIMENTS

Figure 1:
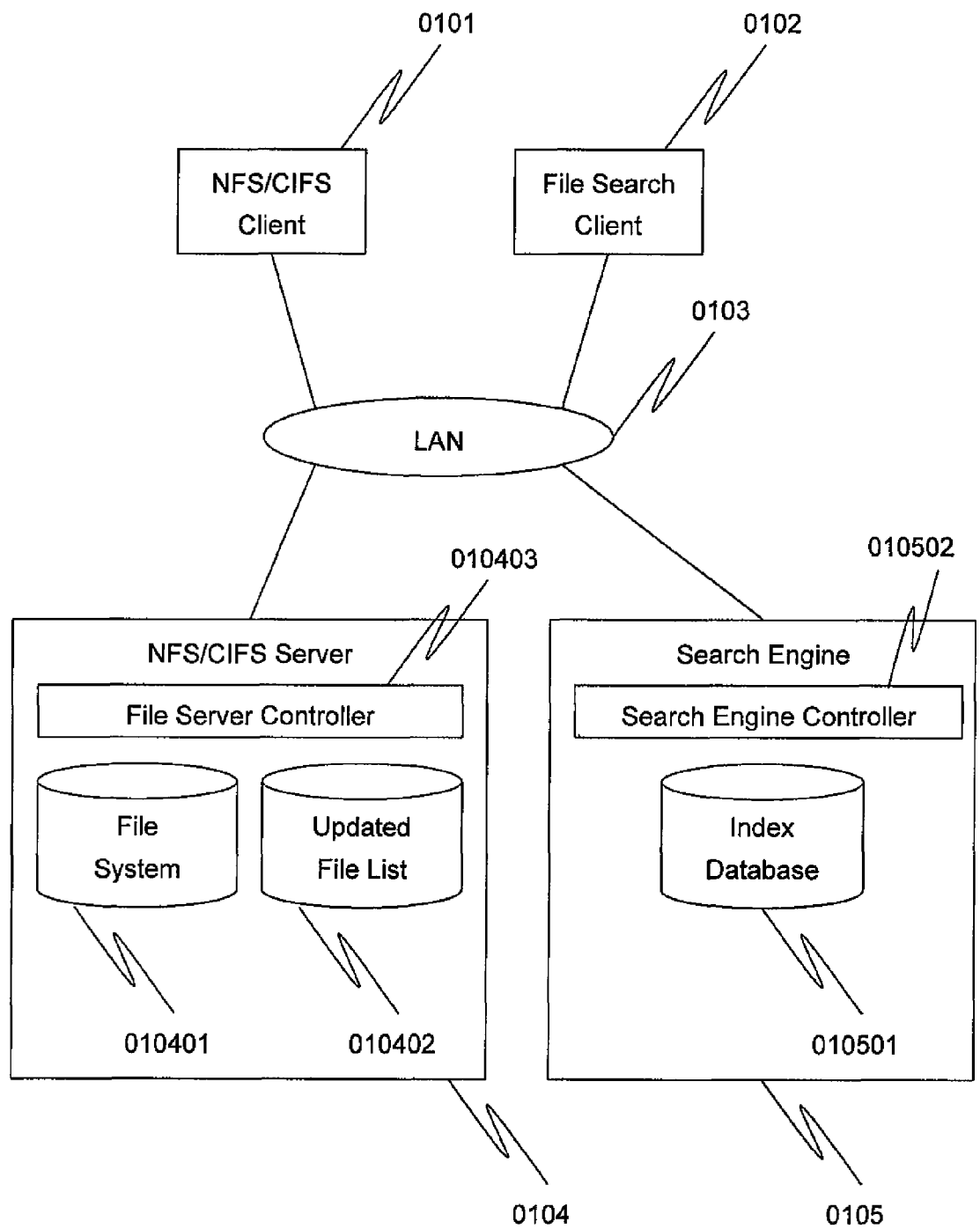
FIG. 1 is a high level generalized block diagram of an illustrative embodiment of the present invention.

FIG. 1 shows a high level block diagram outlining the basic architecture of an example embodiment of a search engine environment in accordance with the present invention. The figure shows at least one file server 0104 having one or more files which can be accessed by users on a network 0103. A file server controller 010403 provides the processing capability conventionally associated with a file server. This may include a central processing unit (CPU), memory, and storage for program code to control the operation of the CPU.

The files stored on a file server are organized into a system of files 010401. In one embodiment of the invention, the file server can access an update list 010402. In general, the update list can be contained in physical storage in a suitable location.

In a more general sense, the file server element 0104 shown in the figure represents a plurality of file servers, each storing its own set of files. A typical protocol that file servers use is the network file system protocol (NFS). Another conventional protocol is the common internet file system (CIFS) protocol. Still other protocols such as HTTP can be used by a file server.

The architecture typically includes at least one NFS/CIFS clients 0101 who communicate with the file server(s) 0104 over the network 0103 via the NFS or CIFS protocol in order to read and write files in the file server. Clients include creators of the files, and users who can access the file to either read or modify files, or read and write files. In a more general sense, the client element 0101 of FIG. 1 represents a plurality of users, each capable of accessing one or more of the file servers.

A search engine server 0105 communicates via the network 0103. A file server controller 010502 provides the processing capability conventionally associated with a search engine. This may include a central processing unit (CPU), memory, and storage for program code to control the operation of the CPU. Although this embodiment of the invention is described using a search engine, it will be appreciated from the following description that aspects of the invention can be incorporated into any machine in a networked environment that tracks files and updates to the file. The search engine is merely a convenient example to use because search engines are well understood and familiar to most people who interact on a computer network.

A typical function of most search engines is the creation and maintenance of an index. The specific content and structure of the information comprising an index, and the specifics of the parsing function are beyond the scope of the present invention. For the purposes of discussion, it can be appreciated by those of ordinary skill that one can refer to an index on a particular file system, or an index associated with a file system. The index information can be represented generically as an index database 010501, without loss of generality.

The index is created and subsequently updated and otherwise maintained by the search engine. This activity includes parsing or otherwise generating information from files in the file server(s) 0104 in order to create the index database. It can be appreciated that the search engine can use the same NFS or CIFS protocol to access files in the file server(s).

The architecture shows at least one file search clients 0102. These are the users who access the search engine to submit file search requests. It can be appreciated that a "user" can be a human user or a machine user. An interface is understood to be provided by the search engine that is suitable to the kind of user being serviced. In a generalize sense, the file search client element 0102 shown in FIG. 1 represents a plurality of search clients.

The network 0103 is generally any suitable communication network that allows for communication among the various servers and clients mentioned above. The figure shows a local area network (LAN), but it can be appreciated that other communication networks are equally suitable. Connectivity to a LAN network is typically provided by the ethernet standard, using the TCP/IP protocol.

The file server 0104 and the search engine server 0105 each can be embodied in conventional computer hardware (e.g., comprising a suitable CPU, memory, storage devices, and so on). Conventional software platforms can be used to support the server; e.g., Unix or other UNIX-based OS's, Macintosh OS, various Microsoft OS's, and so on. It is also possible that the file server and the search engine server can run on same hardware and software platform. For example, NFS server and a search engine software can run on a Linux OS.

Figures 2, 2A:
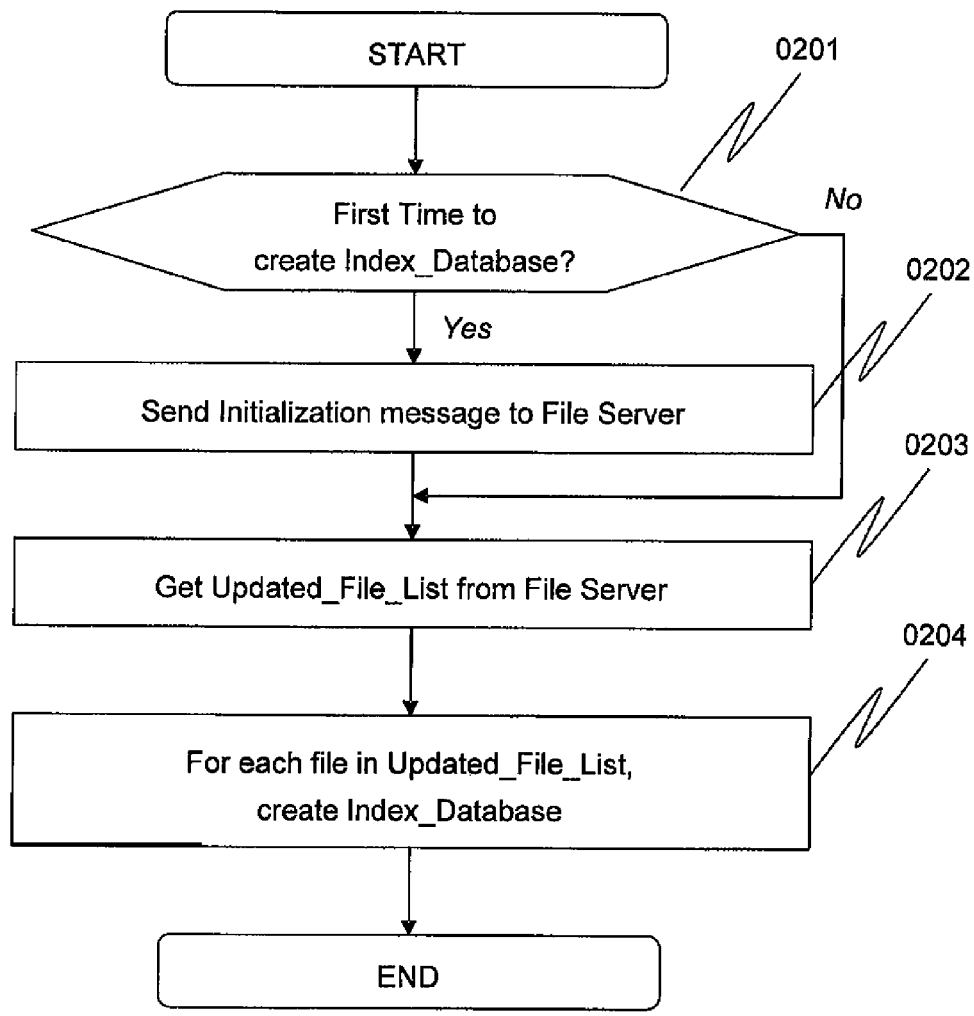
FIG. 2 is a generalized flow diagram highlighting the processing for creating an index.

Referring to FIG. 2, processing in the search engine includes creating an index database. The "index" is used by the search engine when processing a search request. The index is consulted to identify those files, if any, which satisfy a search client's request. It can be appreciated that the term "index" is a very generalized reference to the specific data that a particular search engine may use. It is understood that the specific data structures and storage formats which comprise an "index" is likely to vary from one search engine to another. However, a search engine's index is likely to contain information about a file and its content (e.g., keywords).

In a particular embodiment, the index may be one large database or some other single organization of data representing all file servers. However, logically, one can refer to each file server as having its own associated index; it being understood that reference is being made with respect to that portion of index structure associated with a file server.

Thus, when a search engine first comes online, an index is created for all of the files that can be accessed from a file server; this is done for every file server that is made known to the search engine. Also, if a search engine which is already online learns of a new file server, an index needs to be created for the accessible files contained in that file server. This is represented in FIG. 2 at decision step 0201, where a determination is made whether the index is to be created for a particular file server.

For a new file server, the search engine sends an initialization operation (see FIG. 4) to the file server in a step 0202. This causes the file server to clear its associated update list 010402. This embodiment assumes, without loss of generality, the use of one file server as an example. Thus, the step 0201 is for creating the index for the first time. In case of multiple file servers, a table can be provided to manage which file server the search engine made an index and at which time. See FIG. 2A as an example. In this example, one file server can have multiple export points.

Referring to the decision step 0201, if the index for a file server was previously created, then the search engine accesses update information contained in an update list 010402 associated with that file server (step 0203). Then in a step 0204, files referenced in the update information are accessed by the search engine (see FIG. 4). For each file, the search engine will parse through (or otherwise analyze) the contents of the file to produce index information that is suitable for the index. The search engine can access each file one at a time and perform the parsing. Alternatively, the search engine can access groups of files at a time and perform the parsing operation on the group.

In one implementation, the update list can be accessed by the search engine, just like any other file. Thus, the file server creates a special file that contains a list of updated files and the search engine retrieves a copy of the file from the file server and stores it as a local copy. The search engine also deletes the contents of the special file. The search engine can then operate on the local copy; e.g., reading through the file to identify the files to parse. Alternatively, a protocol can be defined between the search engine and the file server to obtain the information contained in the update list. For example, the file server can communicate to the search engine each file name of the files in the updated file or a list of every file name of the files in the update list to be processed in the search engine. In accordance with another implementation the search engine can receive the actual files in the updated list instead of a list of file names from the file servers.

Figure 3:
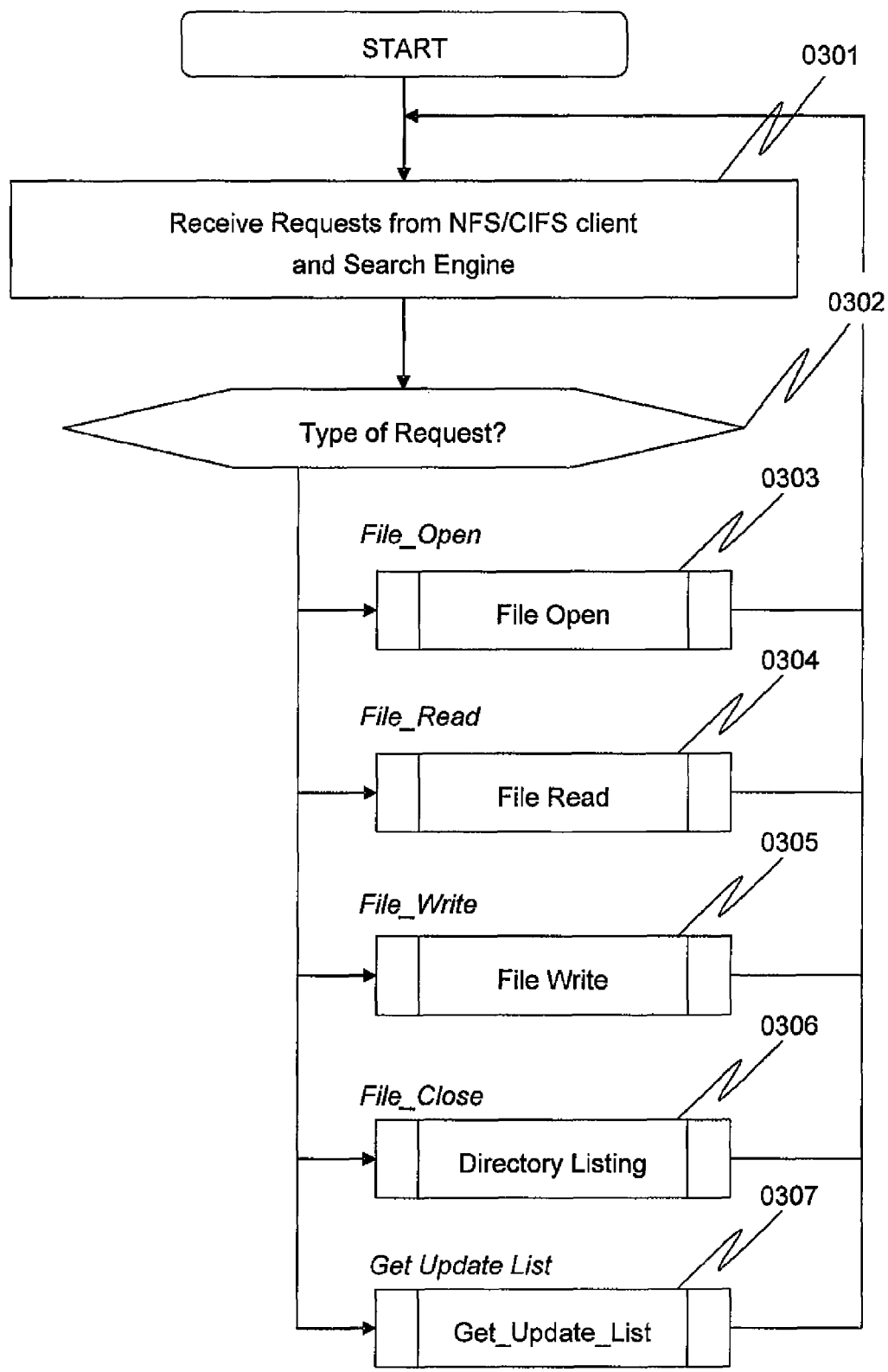
FIG. 3 highlights the processing of file service requests in a file server.

Referring to FIG. 3, a file server receives many requests for file operations. Typical operations include, for example, file creation, file open, file read, file write, directory listings, and so on. The specific file operations provided vary depending the file system and the protocols for communicating with the file server; e.g., NFS, CIFS, etc.

Thus, in a step 0301, the file server receives a file operation request from a client. In a determination step 0302, the request is handed off to an appropriate handler. For example, a file open request is handled by a file open handler 0303. A file read request is handled by a file read handler 0304. A file write request is handled by a file write handler 0305 in accordance with an embodiment of the present invention. This aspect of the invention will be discussed below. A directory listing request is handled by a directory listing handler 0306 in accordance with another aspect of the present invention. The directory listing request will be discussed further below. A "get update list" request is handled by the handler 0307. This function is provided in accordance with an embodiment of the present invention and is discussed below.

Figure 5:
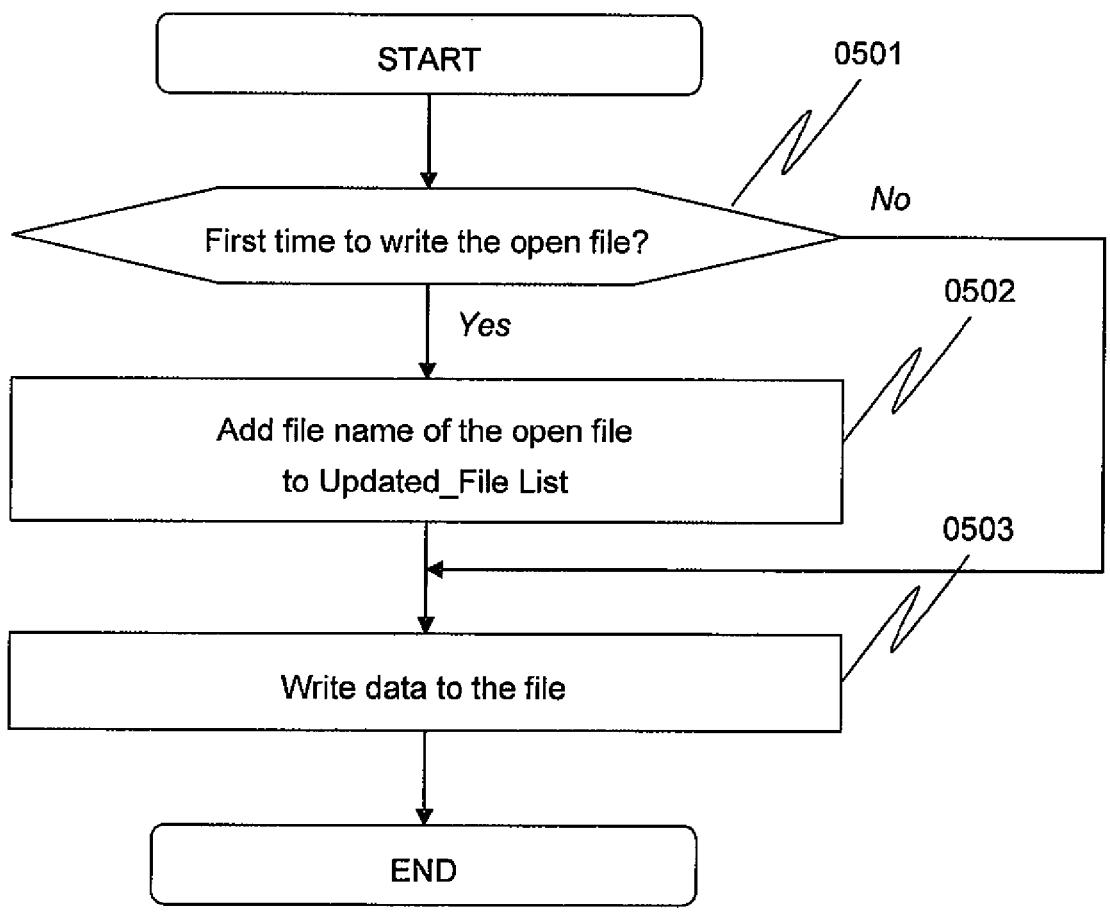
FIG. 5 is a flow diagram highlighting steps in the file server for processing a write request.

Referring to FIG. 5, processing of a file write operation in the file server in accordance with the present invention will be discussed. A file write operation changes (modifies) the content of the specified file. The file server makes a determination in a step 0501 whether this is the first write operation on the file since it was opened. If it is the first write operation since the file was opened, then in a step 0502 a reference to the file is placed in the update list 010402 associated with the file server. If it is a write operation subsequent to the first write operation after the file was opened, then processing proceeds to the next step. Typically, the next step is to effect the requested write operation (step 0503), the details of which depend on the specific file server.

The purpose of checking for the first write operation in step 0501 is to avoid having multiple entries in the update list 010402 for the same file. One way to achieve this is as disclosed in step 0502. Alternatively, the update list can be inspected each time to determine whether the file is already in the list or not.

In the case of file creation, a created file initially contains no data. Therefore, it is not necessary that the file server make an entry in the update list to refer to a newly created file. When content is placed in the file, this will occur via a file write operation. However, in some file systems, the file create operation may leave the file in a state where subsequent write operations can be performed; thus obviating the need for a separate file open function call. Therefore with reference to the decision step 0501 in FIG. 5, it can be appreciated that the test can be modified to include testing for the first write operation following a file open operation or a file create operation.

Figures 8, 9:
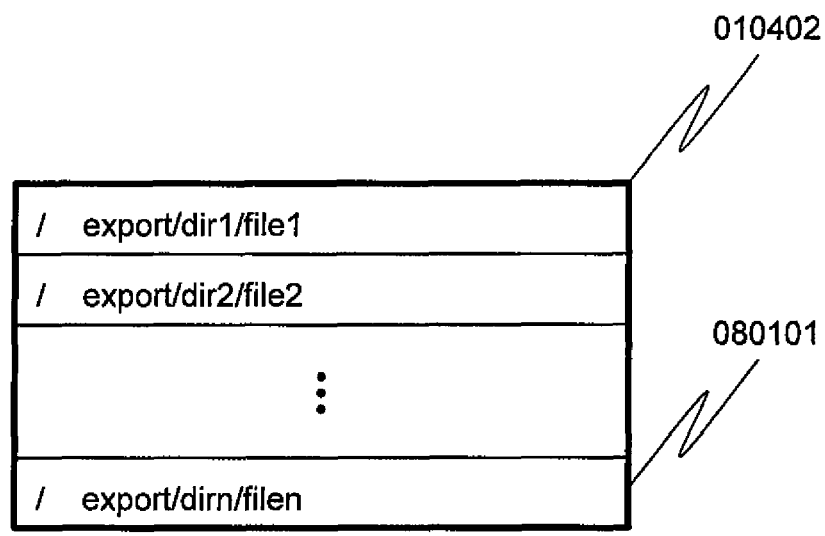
FIG. 8 illustrates an example embodiment of an updated list.
FIG. 9 illustrates an example embodiment of a file filtering table.

Referring to FIG. 8 for a moment, the information contained in the update list identifies the file that is the object of the write operation. For example, in a hierarchical directory organization, a complete path name of the file should suffice. Other naming conventions might be more suitable. The specific information will depend on the specifics of the filed serve, or the file system, and the like. Thus in FIG. 8, an typical implementation exemplar of the update list 010402 is shown. The implementation shown comprises a list of file names. Each file that is referenced in the update list has been modified. Each entry 080101 comprises a files name, including a full path name.

Figure 4:
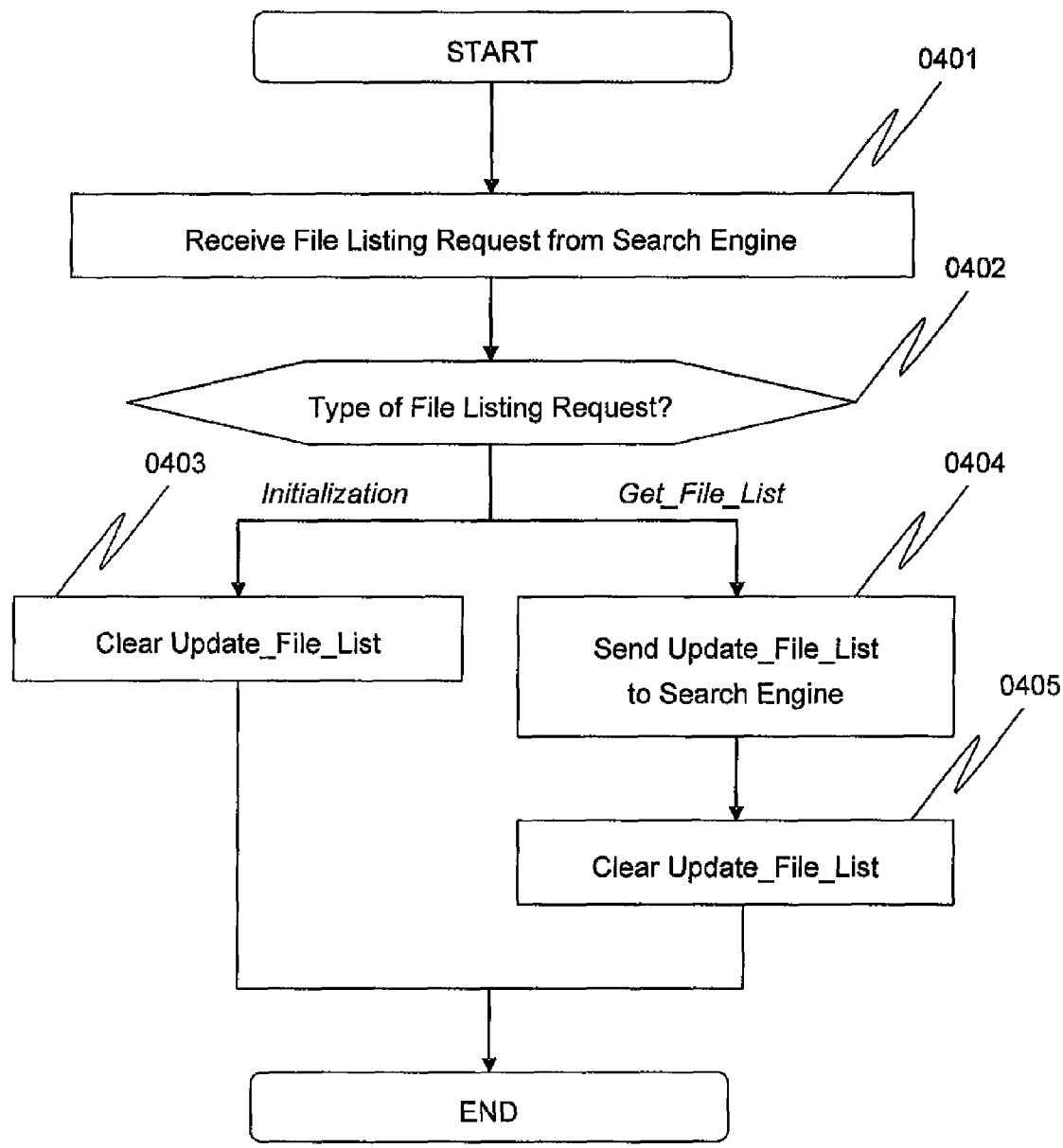
FIG. 4 is a high level flow diagram showing steps in the file server for processing update lists.

Referring to FIG. 4, the "get update list" request comprises two kinds of operations. When the file server receives a get update list request in a step 0401, it determines in a decision step 0402 whether the request is for an initialization operation or for a retrieval operation of the update list. If the request is an initialization operation, then in a step 0403, the file server simply clears the update list, if one previously existed. If an update list did not already exist, then the file server will create an update list. This aspect of the invention is discussed further below.

The particular implementation shown in FIG. 4 uses a special protocol between a file server and a search engine to communicate an updated file list. It can be appreciated that in accordance with another implementation, the search engine can use standard NFS/CIFS protocols to get a updated file list from a file server. In such an implementation, the updated file list is stored on the file server as a file. So the search engine reads the file via standard NFS/CIFS protocols and knows which files have been updated by reading the file. The content in the special file must be cleared after the read by the search engine.

Continuing with the figure, if the request is a get_file_list operation, then the file server will communicate the update list to the search engine (step 0404). A copy of the file can be communicated to the search engine, just like any other file. Alternatively, the file server can communicate the actual files to the search engine; either one at a time, or in groups, or in some other suitable manner. For each file in the update list, the search engine will analyze the file and update the index with information produce by the analysis, thereby updating the index.

When the update list is communicated to the search engine, the update list is cleared, in a step 0405. Thus, if the update list is communicated to the search engine as a single file, the update list can be cleared after the communication is complete. If the file server communicates files to the search engine instead, then each file that is referenced in the update list can be deleted from the update list after it is communicated to the search engine.

After the update list is cleared, the list is once again filled with references to files that are modified. The files referenced in the update list therefore represent those files that have been modified subsequent to a point in time when the update list was last cleared. Stated from a different point of view, the update list contains a list of file references that have been modified since the last time the update list was retrieved by the search engine.

From the point of view of the search engine, files referenced in the update list represent those files that have been modified subsequent to a point in time when the index was being updated. It can be appreciated that updating the index can be a time consuming operation. Thus, in practice, the clearing of the update list by the file server (by virtue of a get_file_list request) may very well occur before the completion of updating the index by the search engine.

The next time the search engine retrieves the update list to perform an update of the index, it will only need to parse through those files which were modified since the previous update operation on the index. The update list therefore avoids the search engine having to perform the brute force task of accessing and parsing every file on a given file server in order to update the index.

An index can be created for a file that does not have one. This situation may arise because the search engine was not previously aware of the file system, or for some reason it was decided to delete a previously existing index for the file system. When the search engine has completed the process of creating the index, it will send a get_file_list request for an initialization operation. This has the effect of creating the update list or of clearing an existing update list. If the file system was not previously known, then the file system may not likely to have an update list. In that case, an update list is created. If the file system already had an update list, then the initialization operation will serve to clear the list.

Based on the foregoing discussion, it can be appreciated that each file server has its own associated update list. However, as an alternative implementation, it is conceivable that an update list can be implemented that is accessible by two or more file servers that contains references to modified files from the two or more file servers. In the most general case, a global update list can be provided. However, this type of update list may or may not be preferable, depending on performance considerations, implementation considerations, and so on. In another alternative, one file server maintains multiple updated files. One update list is associated with one export point of the file server.

Figure 10:
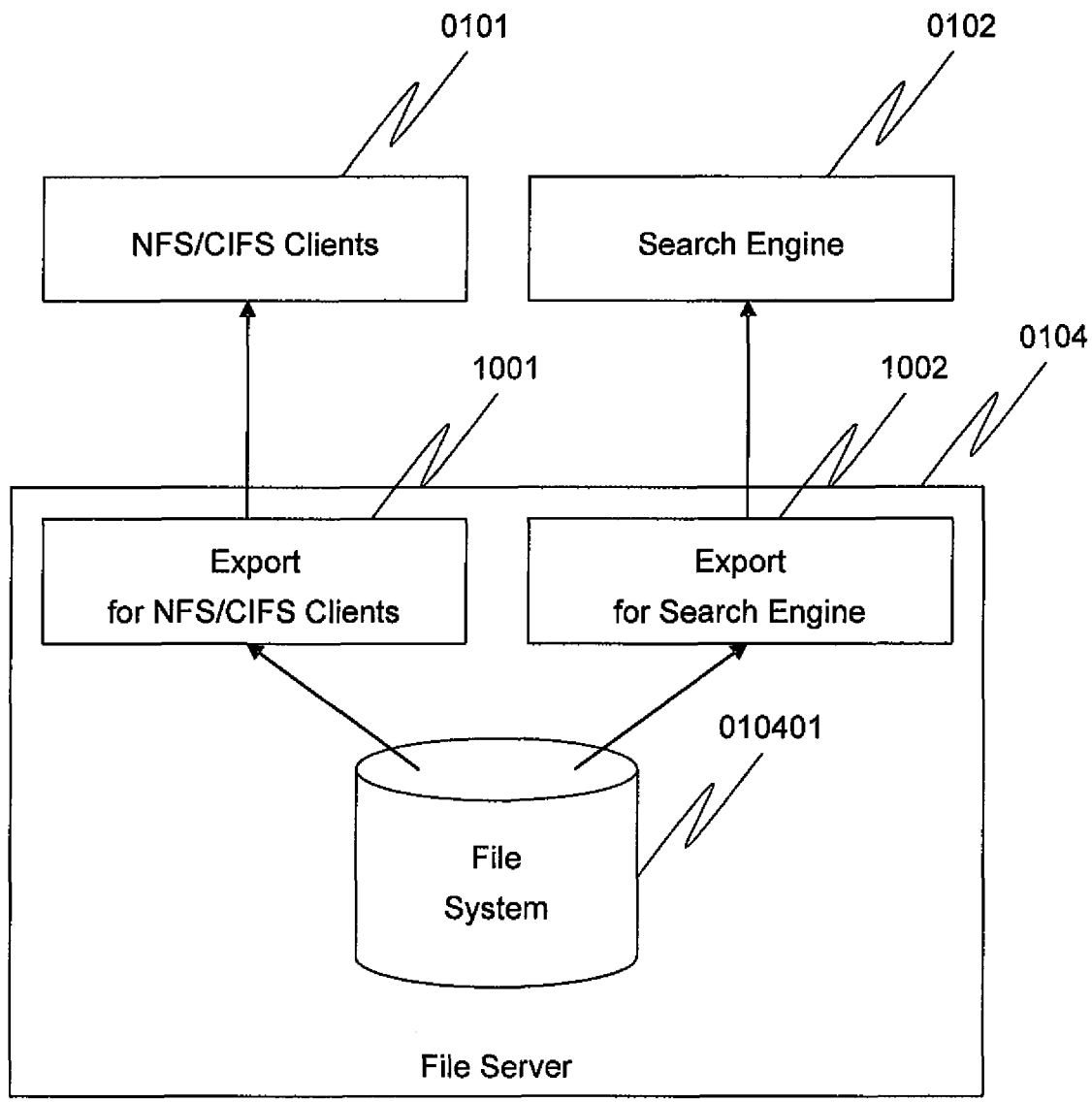
FIG. 10 illustrates multiple exports.

Referring to FIG. 10, in accordance with another embodiment of the present invention, a file server can be configured to provide different exports of a file system to different clients. Under NFS and CIFS conventions, a client "mounts" an export of the file system. Mounting is a process involving a series of communications between NFS/CIFS clients and the file server in order to make the export accessible by the NFS/CIFS clients. An export is a name of a file system to be shared or a name of a directory to be shared by NFS/CIFS clients.

As illustrated in FIG. 10, the file system 0104 provides a first export 1001 that can mounted by clients other than a search engine. A second export 1002 is provided by the file server to be mounted by the search engine. Both exports are on the same file system or directory 010401. The file server knows which export the search engine has mounted; for example, a mapping relationship can be described in a special file in the file server.

In accordance with this embodiment, the search engine performs conventional processing to either create an index on the files on the file server, or to update the index. The search engine mounts the export that has been made available by the file server. An administrator of a file server creates an export for a search engine. An administrator of the search engine specifies a list of exports that the search engine needs to make an index. This can be done, for example, by editing a special file in the search engine. By using a directory service, this configuration can be done systematically. The search engine then makes one or more requests for directory listing(s) of files on the file server; for example, using the standard requests provided in the NFS and CIFS protocols.

In the case where the index is being created for the file system, each file identified in the directory listing(s) is parsed and indexed. In the case where the index is being updated, the search engine determines whether the file should be parsed for indexing based on the modification date (or some other similar information) of the file. If the file was modified since the last time the index for this file system was updated, then the file is parsed and indexed; otherwise it is not parsed.

In accordance with this aspect of the invention, the list of files made available via a directory listing by the file server to the search engine is less than the files that are available in a directory listing to other clients. This is made possible because the search engine mounts an export that is different than the export that is mounted by clients other than the search engine. As will be discussed now, the file server is configured to perform differently depending on which export the file service request is being made; e.g., a directory listing service request.

Referring to FIG. 9, a file server configured according to this aspect of the invention includes a file filtering table 0901. The table contains conditions (criteria) 090101 that describe what kinds of files will be made available to an export that is mounted by the search engine. For example, users of the search engine may want to restrict files to be searched based on file type. Types of files can be determined by a file extension such as .ppt, .doc, .xls, and so on. In this case, files that having certain file extensions may be determined to be candidates for searching. Another criterion for determining which files can be searched might be based on file ownership, file creation time, file size, and so on.

The file filter table embodiment show in FIG. 9 is an inclusive table. This means that the file filter table specifies those files which should be included in the directory listing. For example, all ".doc" files will be included in the directory listing for a given directory. However, ".exe" files will not be included; i.e., excluded from the list. It can be appreciated that the file filter table can be an "exclusionary" table. Thus, the table specifies those files which will be excluded from the directory list. Thus, for example, an exclusionary table might contain the criterion of ".exe", meaning that all files in a directory will be included in the directory list except for files of type ".exe". Still another variation of the file filter table is to be able specify files to be included and files to be excluded.

Typically, files that are indexed are those that contain text. Some search engines will also index files that have graphics or some kind of image data, if there is corresponding text in the file. The file filter table can reduce the set of files that the search engine must consider by filtering out executable files or other files which do not contain data that can be searched.

Figure 7:
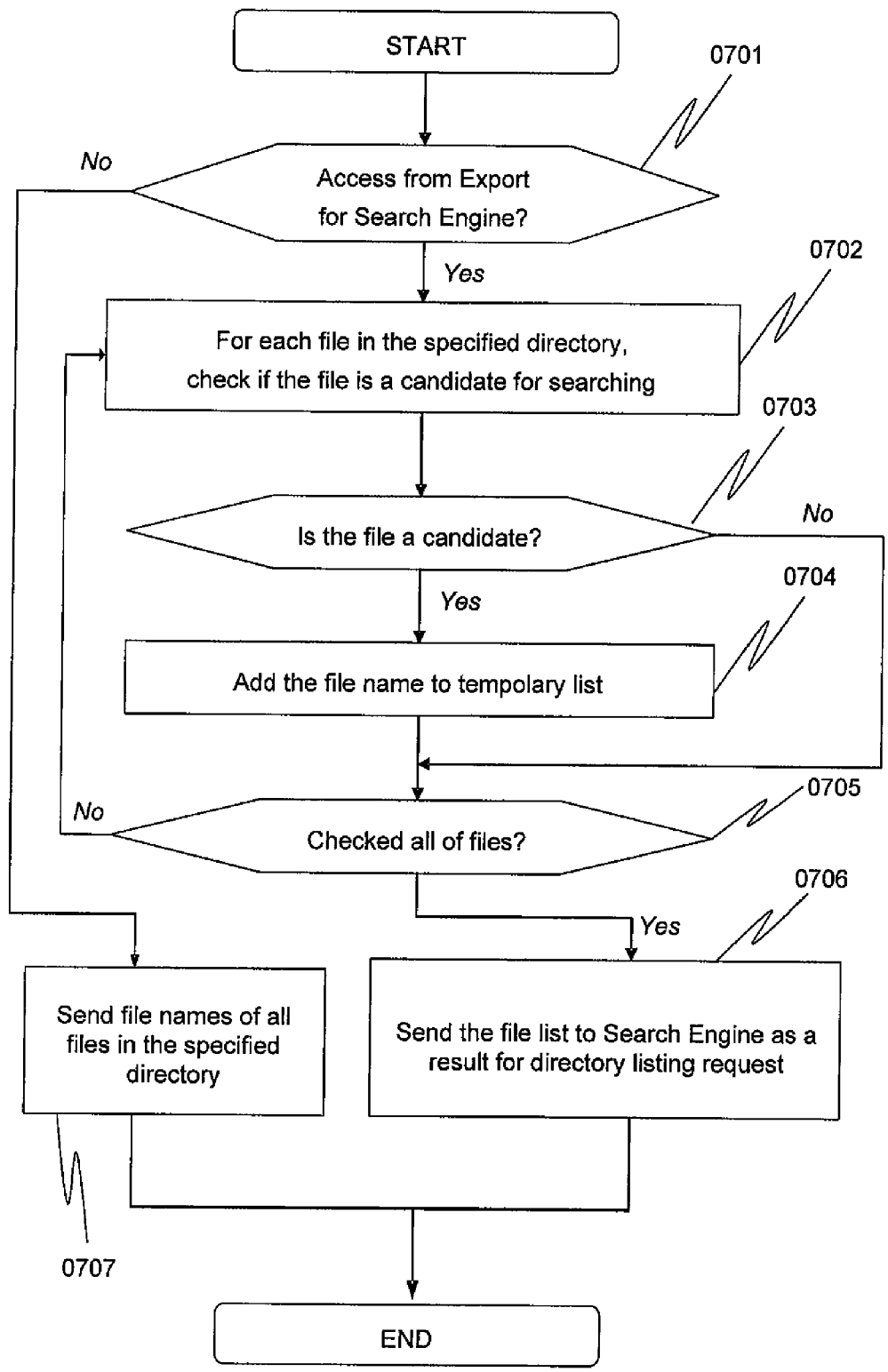
FIG. 7 is a generalized flow diagram highlighting steps in the file server for processing a directory listing request.

FIG. 7 illustrates an example of the processing for a directory request that is made on an export that a search engine has mounted. The file server determines if the directory listing request issued from the search engine, step 0701. The directory listing request includes information as to which export the request was issued on. Since, the file server knows which export the search engine has mounted, the file server can make this determination. If the request did not come from a search engine, then in a step 0707, a conventional directory listing is produced and communicated to the requesting client.

If the request originated from a search engine, then in a step 0702, the file server consults the file filtering table 0901 to determine (step 0703) for each file in that directory whether it will be contained in the directory listing information. If the file meets the criterion(a) set forth in the file filtering table, then a reference to the file is added to a temporary list (step 0704). The file server can determine whether the request came from a search engine or from a client by looking at which export the request has been issued or by looking at an IP address of the requester, or by some other suitable identification technique. Also, the file server can maintain a suitable list that identifies one or more computer systems (e.g., search engines) for which the file filtering table will be used to satisfy a directory request.

If the file does not match any of the criteria in the file filtering list, then it will not be added to the temporary list. In a step 0705, a check is made to determine whether all of the files have been checked against the file filtering table. If more files need to be checked, then processing continues with step 0702. Otherwise, the temporary list is further processed in a step 0706 to produce a suitable directory listing that can then be communicated back to the search engine. This might include adding a listing of the subdirectories to the temporary list. File attributes of the files contained in the temporary list may need to be supplied. This might include information such as file size, creation date, modify date, permission information, and so on. The directory information is then communicated to the search engine as a response to the directory listing request.

It can be appreciated that the directory listing that the search engine receives is filtered by the file filtering table, and thus can contain a subset of the files that a non-search engine client might receive. By virtue of this reduced file list, processing in the search engine to create an index for the file system or to update it index can be reduced, as compared to conventional processing where an unfiltered directory listing might include many more files.

Figure 6:
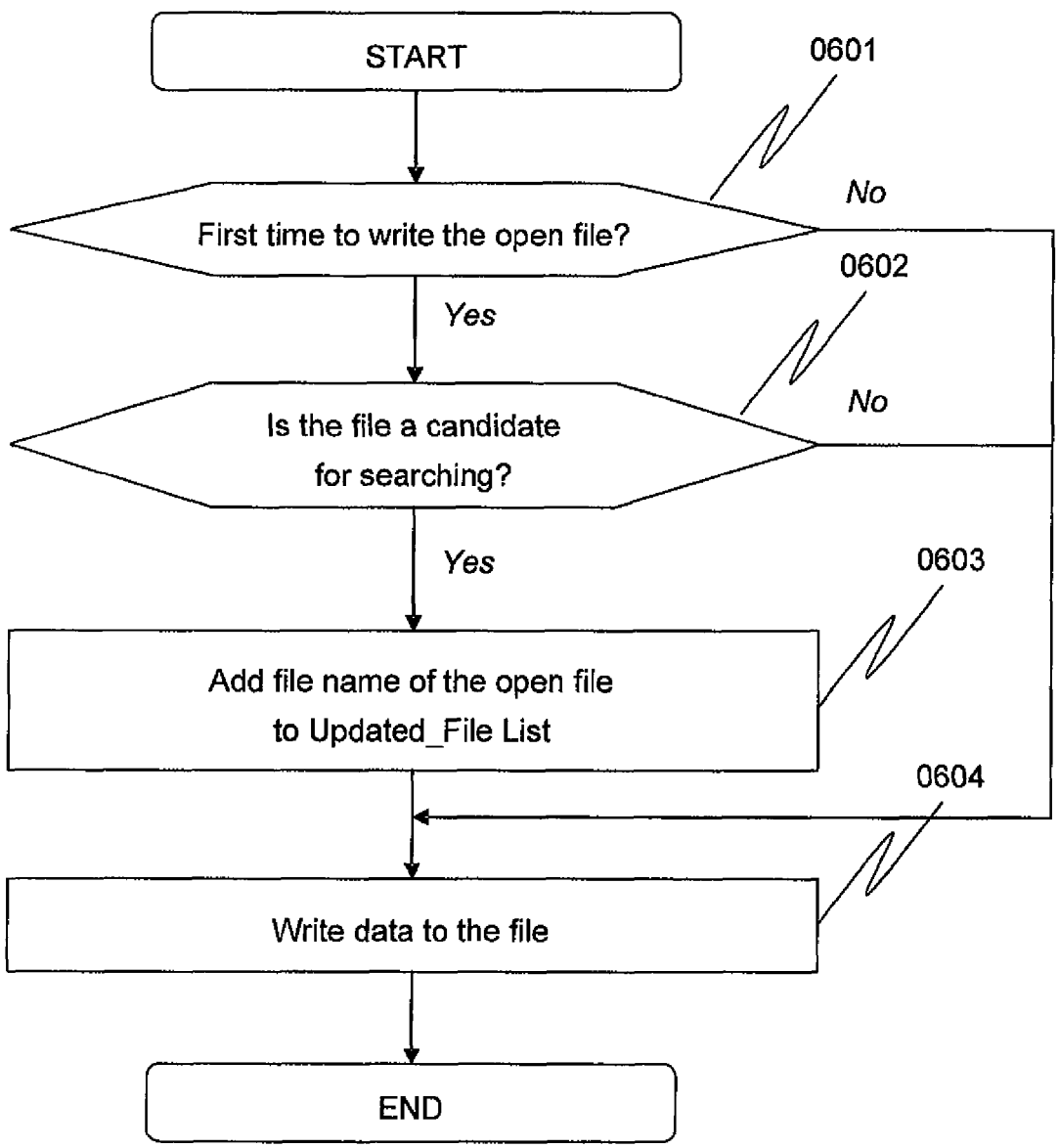
FIG. 6 is a flow diagram highlighting steps in the file server for processing a write request according to another embodiment of the present invention.

Referring to FIG. 6, still another aspect of the present invention is directed to the processing in the file server of write requests. When the file server receives a write request, a determination is made in a step 0601 whether the write request is the first write request since the specified file was last opened. If the write request is not a first write request, then the write request is processed in a conventional manner (step 0604), according to the specifics of the file server.

If the write request is the first write request since the last file open operation, then processing proceeds to a decision step at step 0602. There, a file filtering table 0901 is consulted. This table is used in the same manner as discussed above. If the file that is the object of the write operation satisfies any of the criteria in the file table, then a reference to the file is added to an update list 010402, in a step 0603. If no criteria are satisfied, then the write operation is completed in a conventional manner in step 0604.

It was noted above in connection with FIG. 5 that in the case of file creation, a created file initially contains no data. Therefore, it is not necessary that the file server make an entry in the update list to refer to a newly created file. When content is placed in the file, this will occur via a file write operation. However, in some file systems, the file create operation may leave the file in a state where subsequent write operations can be performed; thus obviating the need for a separate file open function call. Therefore with reference to the decision step 0601 in FIG. 6, it can be appreciated that the test can be modified to include testing for the first write operation following a file open operation or a file create operation.

It can be appreciated that this aspect of the invention is similar to the aspect of the invention discussed in connection with update lists. The search engine will consult the update list associated with the file system when it is ready to perform an update of its index for that file system, as discussed above. Thus, the search engine need only access and parse those files referenced in the update list when performing an index update. However, with the use of the file filter table, the size of the update list can be reduced somewhat. This has the desired effect of potentially reducing the index update time.

What is claimed is:

1. A search engine which accesses a plurality of file servers over a network, where each of the file servers stores a plurality of files and, when one of the files in one of the file servers is modified for a first time after a most recent clearing of a respective update list in the one of the file servers, information representative of the modified one of the files is added to the respective update list stored in the one of the file servers, where when the one of the files is modified for a second time after the most recent clearing of the respective update list, the respective update list is not updated, each respective update list being stored by a corresponding one of the file servers and containing information representative of files that have been modified, the search engine comprising:
a central processing unit (CPU);
memory; and
at least one storage device which stores a plurality of indices, where each one of the indices includes information produced from an analysis of one or more of the files in a respective one of the file servers, the indices being accessed by a first computer other than the file servers over the network,
wherein the CPU executes processing to:
request the respective update list from each of the file servers;
receive information from each respective update list of the file servers, thus identifying each file contained in each respective update list;
for each file contained in each respective update list, update a corresponding one of the indices with information produced from an analysis of the file, whereby the updating is performed only on those files which have been modified; and
clear each update list in the respective file servers,
wherein the CPU executes further processing to manage information relating each of the file servers with an export point of the information from the respective update list of each of the file servers used to update the indices,
wherein the corresponding export point is received along with the information from the respective update list of each of the file servers, and
wherein the plurality of files are identified by one or more filtering criteria on the file servers, the update list identifies those files which have been modified by the one or more filtering criteria, and updating of the indices is made with reference to a specific one of the one or more filtering criteria.

2. The search engine of claim 1 wherein when obtaining the information from each respective update list of the file servers, the CPU executes processing to communicate to the first computer first information representative of one or more files referenced in one of the update lists.

3. The search engine of claim 2 wherein each update list is stored in a respective one of the file servers.

4. The search engine of claim 2 wherein the first information comprises file references contained in the one of the update lists.

5. The search engine of claim 2 wherein the first information comprises copies of the files referenced in the one of the update lists.

6. The search engine of claim 1 wherein each update list is stored in a respective first file and when obtaining information from each the update list, a copy of the first file is transmitted to the first computer.

7. The search engine of claim 6 wherein each respective first file is stored in a corresponding one of the file servers.

8. The search engine of claim 1 wherein the CPU further executes processing to clear each update list when a corresponding one of the indices is updated, wherein contents of the update list are deleted.

9. The search engine of claim 1 wherein the indices are also stored in the first computer.

10. The search engine of claim 9 wherein the first computer is a search engine server, wherein the indices facilitates performing a search of files stored in the file servers.

11. A file server connected to a first computer over a network, the file server comprising:
a central processing unit (CPU);
memory; and
a storage location which stores a plurality of files;
wherein the CPU executes processing to:
receive a request for a file operation to be performed on a first file of the plurality of files;
when the file operation is a write operation, store a reference into an update list which identifies the first file if the write operation is the first write operation after the most recent clearing of the update list and not storing the reference into the update list if the write operation is a second write operation after the most recent clearing of the update list, whereby the update list includes references of only those files whose content has been modified;

receive a request from the first computer for the update list and in response thereto, communicating information contained in the update list to the first computer; and after communicating the information contained in the update list to the first computer, remove the information contained in the update list from the storage location, wherein an export point is sent to the first computer when communicating the information contained in the update list to the first computer, and the export point corresponds to the information contained in the update list, and wherein the update list identifies files which have been modified by one or more filtering criteria, and only files of a specific one of the one or more filtering criteria contained in the update list are communicated to the first computer.

12. The file server of claim 11 wherein the storing of the reference is performed only upon detecting the write operation which is a first of a plurality of write operations.

13. The file server of claim 12 wherein the write operation is received subsequent to receiving a clear request.

14. The file server of claim 11 wherein the content of the update list is communicated to the first computer.

15. The file server of claim 14 wherein a copy of the update list is communicated to the first computer.

16. The file server of claim 15 wherein the CPU further executes processing to receive from the first computer file operation requests for reading files identified in the update list, and in response to each such request the requested file is communicated to the first computer.

17. The file server of claim 16 wherein the first computer is a search engine.

18. The file server of claim 11 wherein the a copy of each file that is referenced in the update list is communicated to the first computer.

19. The search engine of claim 1, wherein the one or more filtering criteria includes at least one of file type, file owner, file created time and file size.

20. The file server of claim 11, wherein the one or more filtering criteria includes at least one of file type, file owner, file created time and file size.

* * * * *